(12) United States Patent
McAllister et al.

(10) Patent No.: US 8,488,266 B2
(45) Date of Patent: Jul. 16, 2013

(54) ADJUSTMENT OF TAPE REEL HEIGHT

(75) Inventors: Jeffrey S. McAllister, Boise, ID (US); Robert Nemeth, Sollenau (AT)

(73) Assignee: Hewlett-Packard Development Company, L.P., Houston, TX (US)

( * ) Notice: Subject to any disclaimer, the term of this patent is extended or adjusted under 35 U.S.C. 154(b) by 1147 days.

(21) Appl. No.: 12/260,590

(22) Filed: Oct. 29, 2008

(65) Prior Publication Data

US 2010/0102156 A1    Apr. 29, 2010

Related U.S. Application Data

(60) Provisional application No. 61/053,046, filed on May 14, 2008.

(51) Int. Cl.
*G11B 17/00*    (2006.01)
*G11B 5/10*    (2006.01)

(52) U.S. Cl.
USPC ............ 360/71; 360/128; 242/324; 242/348; 242/563.1

(58) Field of Classification Search
None
See application file for complete search history.

(56) References Cited

U.S. PATENT DOCUMENTS 5,206,771 A  *  4/1993  Katou et al. .................... 360/71

* cited by examiner

*Primary Examiner* — Andrew L Sniezek

(57) ABSTRACT

One embodiment is tape drive that includes a take-tip reel onto which tape is wound. A height adjustment assembly adjusts a height of the take-up reel while the tape is being unwound from the take-up reel.

13 Claims, 4 Drawing Sheets

ADJUSTMENT OF TAPE REEL HEIGHT

CROSS REFERENCE TO RELATED APPLICATIONS

This Application claims the benefit of provisional patent application Ser. No. 61/053,046, filed May 14, 2008, titled "Adjustment Of Tape Reel Height" which application is incorporated by reference herein as if reproduced in full below.

FIELD OF THE INVENTION

The invention relates to a tape drive and more particularly a tape drive having a height adjustment assembly that adjusts a height of a take-up reel while magnetic tape is being unwound from the take-up reel.

BACKGROUND

Tape drives store a vast amount of digital information on rolls of magnetic tape and are often used to backup information stored in computer systems. In a typical drive, magnetic tape is stored on a supply reel contained in a removable cartridge. During read and write operations, the tape is passed at a very high speed along a series of rollers that define a tape path to a take up reel in the drive. The tape passes in close proximity to an assembly of read heads and write heads that must be precisely positioned over the desired tracks so data can be accurately read or written.

As magnetic tape is wound onto a tape reel at high speed, the tape entrains air which allows the tape to float over the tape pack. As the tape floats, it drifts to the sides of the reel until the tape finally settles against the top or bottom flange of the reel. The reel flanges are relatively faraway from the edge of the free length of tape to prevent the tape from contacting the reel as the tape is winding. If the free length of tape contacts the reel flanges, the impact will cause the tape to abruptly move laterally and disrupt registration between the read/write head and the data track location. Because of the clearance needed to avoid contact with the reel flanges while winding onto the reel, the tape pack ends up being misaligned in height from the tape guides. As the tape is then pulled from that reel, the misalignment of the tape pack with the tape guides can create excessive stress on the edges of the tape. This misalignment also creates disturbances from the guide flanges to the tape and causes track misregistration.

DETAILED DESCRIPTION

Embodiments in accordance with the present invention are directed to apparatus, systems, and methods that dynamically adjust a height of a tape real in a tape drive to compensate for misalignment of the tape pack with the tape guides. When magnetic tape is being pulled from the tape reel, the height of the reel is automatically changed so the tape accurately aligns with the tape guides or rollers. This adjustment and corresponding accurate alignment ensures that the guide forces on the edges of the tape are not excessive and that the lateral disturbances to the tape from the guide flanges are minimized.

When the tape pack is not properly or centrally aligned between the flanges of the reel, exemplary embodiments change a height of the reel to compensate for this improper alignment. As such, the tape unwinds from the reel in proper alignment with the tape guides and/or read and write heads.

Exemplary embodiments eliminate stress imparted on the tape from contact with flanges on the guides since the tape pack and tape guides are aligned. Further, problems associated with misregistration at the read/write head caused by disturbances between the tape and flanges are eliminated.

Exemplary embodiments enable tighter track density on the tape, and therefore higher storage capacity by reducing the disturbances to the edge of the tape from the tape guide flanges. Manufacturing precision required for the guides and guide flanges are also reduced since the height of the supply reel is automatically adjusted to compensate for misalignment. Furthermore, exemplary embodiments reduce the precision required for the tape reel flanges. Tape life can also be extended since the contact forces between the tape edges and guide flanges are minimized.

Figure 1:
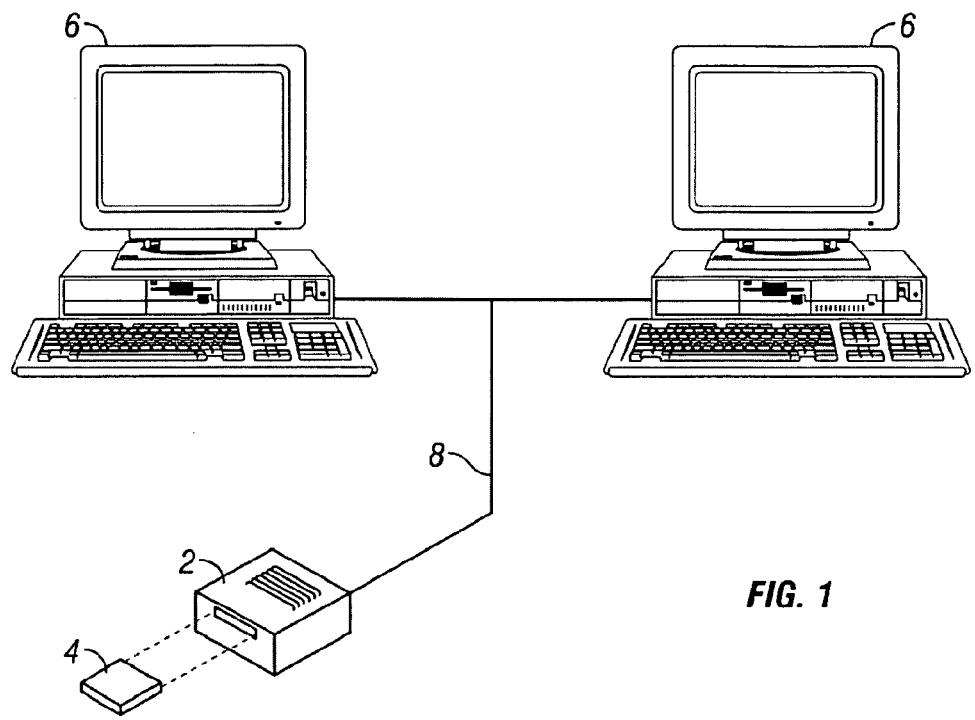
FIG. 1 is a tape drive system in accordance with an exemplary embodiment of the present invention.
Figure 2:
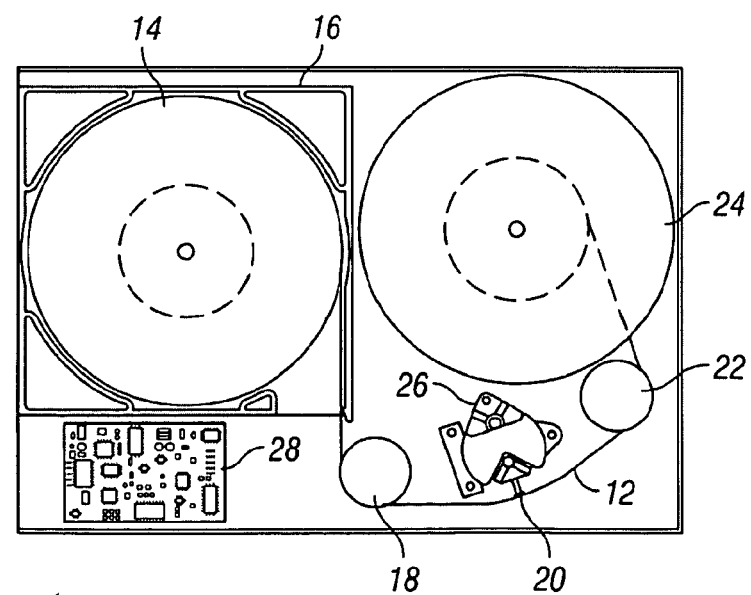
FIG. 2 is a tape drive in accordance with an exemplary embodiment of the present invention.

FIG. 1 illustrates a tape drive 2 with a removable tape cartridge 4 networked to computers 6 through a wired or wireless link 8. FIG. 2 illustrates a tape drive 10 such as might be used in the network of FIG. 1. In tape drive 10 in FIG. 2, magnetic tape 12 is wound on supply reel 14 inside removable cartridge 16. When cartridge 16 is inserted into drive 10, tape 12 passes around guide 18, over head 20, around guide 22, to take up reel 24.

The head 20 includes an array of elements that read and record information on tape 12. Generally, the head converts an electrical signal to a form required to record the signal to a medium (a write element), or reads a signal from a medium and converts it to an electrical signal (a read element), or both. Tape drives typically use magnetic head elements, where an electrical signal drives a time-varying magnetic field that magnetizes spots, or domains, on the surface of the magnetic tape.

Head 20 is mounted to an actuator 26 that moves head 20 across the width of tape 12. An electronic controller 28 receives read and write instructions and data from a computer 6 (FIG. 1) or other host device. Controller 28, which may include more than one controller unit, includes the programming, processor(s) and associated memory and electronic circuitry necessary to control actuator 26, head 20 and the other operative components of tape drive 10. As actuator 26 carries head assembly 20 back and forth across the width of tape 12, controller 28 selectively activates the head elements to read or record data on tape 12 according to instructions received from the host device.

Figure 3:
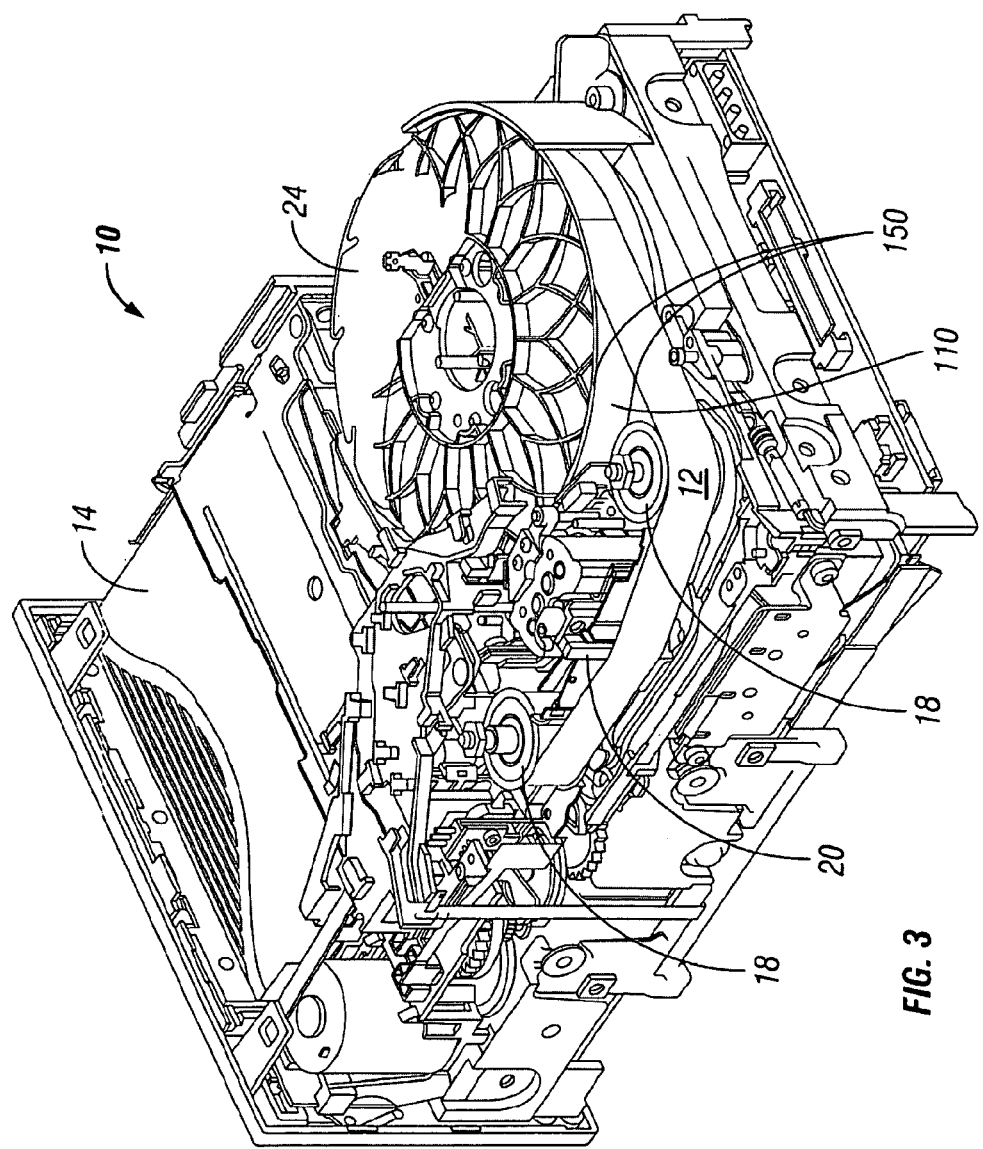
FIG. 3 is a more detailed view of a tape drive in accordance with an exemplary embodiment of the present invention.
Figure 4:
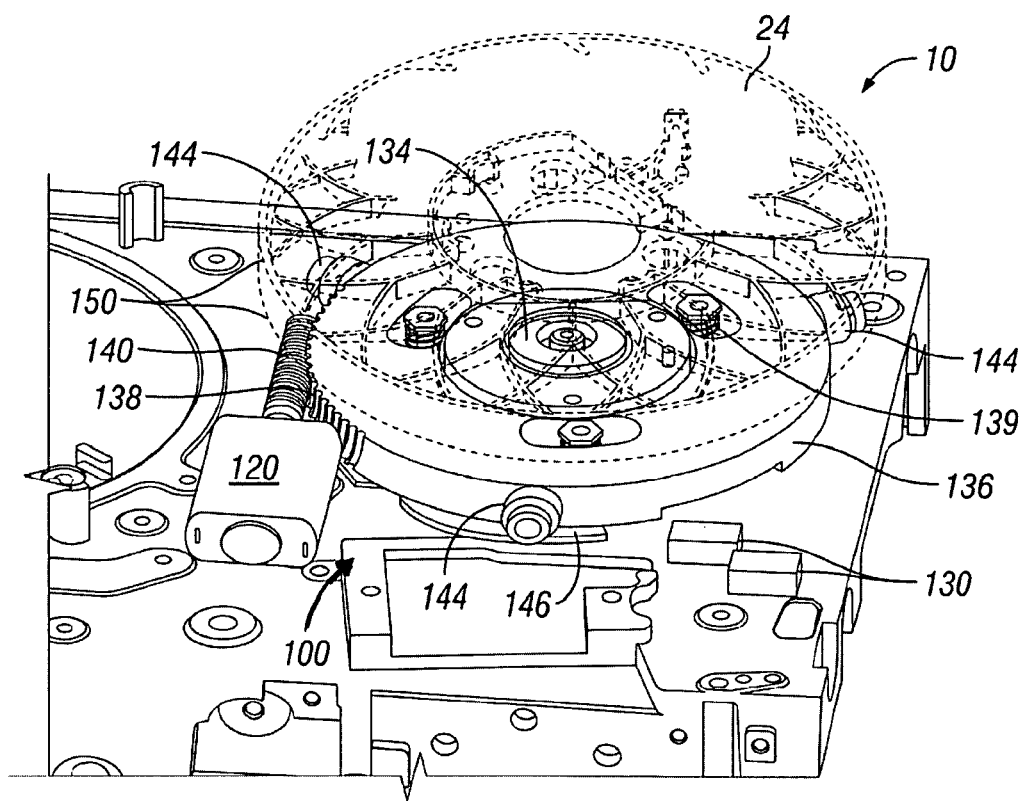
FIG. 4 is a partial view of the tape drive showing the height adjustment assembly in more detail in accordance with an exemplary embodiment of the present invention.

FIGS. 3-4 show a more detailed view of the tape drive 10 shown in FIGS. 1-2. In FIGS. 3-4, portions of the tape drive are removed or not shown for clarity. In the figures, like numerals represent like elements.

In one embodiment, the tape drive 10 includes a height adjustment assembly 100 that adjusts the height of the take-up reel 24 to compensate for misalignment of the magnetic tape 12 and tape pack 110 with the guides 18. The height adjustment assembly 100 includes a motor 120 for moving a position of the take-up reel 24 and one or more sensors 130 for sensing a position of the magnetic tape 12.

The take-up reel 24 is positioned on a reel table 134 and a spindle back assembly 136. The spindle back assembly 136 has a cylindrical or wheel-shape with a plurality of teeth or gears 138 located along an outer surface or perimeter and a plurality of pretension springs 139 (three springs being shown). The motor drives an elongated worm shaft 140 that rotates and engages with the teeth 138. As the worm shaft 140 rotates, the spindle back assembly 136 in turn rotates. The spindle back assembly 136 includes a plurality of rollers 144 (three rollers being shown) that rest on a ramp 146. The ramp has an inclined or sloped surface so as the rollers move up or down the ramp, a height of the spindle back assembly 136 changes.

In one exemplary embodiment, the height adjustment assembly includes three ramps 146. Each roller 144 rests on one of the ramps. In order to lower a height of the take-up reel 24, the rollers 144 travel down the ramps 146 and bring the take-up reel closer to a surface or body of the tape drive. By contrast, in order to raise a height of the take-up reel 24, the rollers travel up the ramps 146 and move the take-up reel farther away from the surface or body of the tape drive.

In one exemplary embodiment, the sensors 130 sense a position of the edge of the magnetic tape 12. For example, the sensors 130 are photonic sensors that are calibrated to sense one micron of movement or deviation of the tape. Sensed position is transmitted to the controller which controls the motor 120.

As tape is unwound from the take-up reel 24, the sensors 130 sense a position of the magnetic tape 12 with respect to the flanges 150 of the take-up reel. As noted, when the magnetic tape 12 is wound onto the take-up reel 24, the tape can become off-center with respect to the two flanges 150. In other words, the tape is not evenly positioned between or equal distance from both of the flanges. Stated another way, the tape pack can be positioned closer in proximity to one of the flanges. When the tape is positioned in such an off-center position (i.e., edges of the tape not centrally aligned between the flanges), the tape will unwind in a misaligned fashion from the take-up reel to the guides 18. The sensors 130, however, sense this misalignment and cause the take-up reel to be raised or lowered to compensate for this misalignment. As such, the tape enters and engages the guides and read/write head as if the tape pack were centrally or evenly aligned between the flanges.

Figure 5:
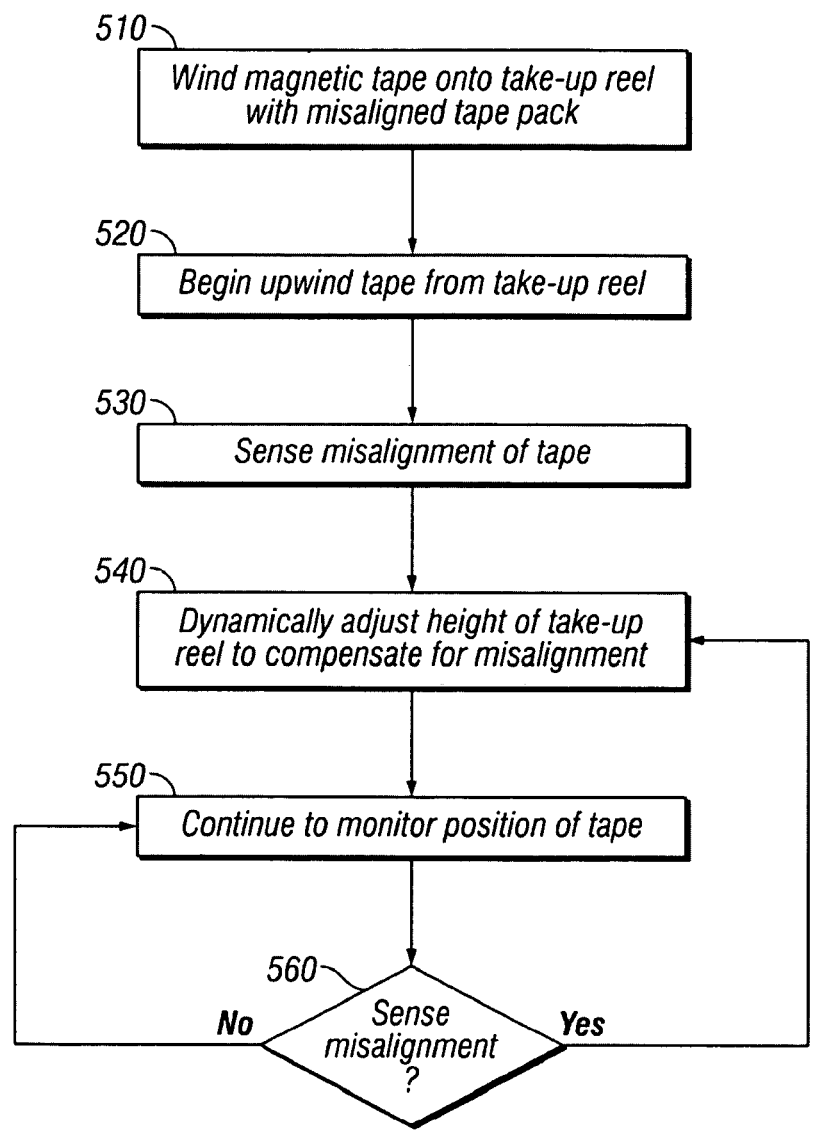
FIG. 5 is a flow diagram for dynamically adjusting tape reel height in accordance with an exemplary embodiment of the present invention.

FIG. 5 is a flow diagram for dynamically adjusting tape reel height in accordance with an exemplary embodiment of the present invention.

According to block 510, magnetic tape is wound onto a take-up reel with a misaligned tape pack. In other words, the tape is positioned in the take-up reel such that opposite edges of the tape are not evenly spaced between opposing flanges. For example, one edge or side of the tape is closer to one of the flanges than the other flange.

According to block 520, the magnetic tape is begun to be unwound from the take-up reel. For example, tape is unwound from the take-up reel along a tape path to a source reel. The tape path includes one or more rollers or guides and a read/write head.

According to block 530, misalignment of the tape pack is sensed. A position of the tape exiting the take-up reel is sensed and a determination is made that the tape is not properly aligned in the take-up reel.

According to block 540, a height of the take-up reel is dynamically adjusted to compensate for the misalignment. In one exemplary embodiment, misalignment of the tape is sensed in increments of one micron or less. In response to the misalignment, a vertical position of the take-up reel is adjusted. For example, the take-up reel is lowered when the tape rides too high inside the take-up reel and is positioned against an upper flange. By contrast, the take-up reel is raised when the tape rides too low inside the take-up reel and is positioned against a lower flange.

In one exemplary embodiment, the height of the take-up reel is dynamically adjusted in real-time as tape is being unwound from the take-up reel. Adjustments of the take-up reel immediately occur to compensate for any misalignment between the magnetic tape and the rollers and/or head.

According to block 550, a position of the tape is continuously monitored as tape moves along the tape path from one reel to another reel.

According to block 560, a question is asked whether further misalignments are sensed. If the answer to this question is □no□then flow proceeds back to block 550 and the position of the tape is continued to be monitored for misalignment. If the answer to this question is □yes□then flow proceeds back to block 540 and a height of the take-up reel is dynamically adjusted to compensate for the misalignment.

Exemplary embodiments of the invention are not limited to any particular type of tape drive or magnetic tape. Further, exemplary embodiments are not limited to any particular type of mechanical mechanism (such as the described height adjustment assembly) for sensing and/or adjusting a height of the take-up reel. Further, although embodiments are discussed with respect to the take-up reel, exemplary embodiments can also be utilized with a source reel. Also, other forms of tape are applicable, such as optical tape.

Definitions:

As used herein and in the claims, the following words have the following definitions:

The term □dynamic□means marked by usually continuous and productive activity or change.

A "head element" or "head" means a transducer that converts an electrical signal to a form required to record the signal to a medium (a write element), or reads a signal from a medium and converts it to an electrical signal (a read element), or both.

The term □real-time□means the actual time during which something takes place (as it comes in).

The term □tape drive □means a data storage device that reads and/or writes data stored on a magnetic tape.

In one exemplary embodiment, one or more blocks in the flow diagrams are automated. In other words, apparatus, systems, and methods occur automatically. As used herein, the terms □automated□or □automatically□(and like variations thereof) mean controlled operation of an apparatus, system, and/or process using computers and/or mechanical/electrical devices without the necessity of human intervention, observation, effort and/or decision.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive, flash memory, or hard drive. The software programming code is embodied or stored on any of a variety of known media for use with a data processing system or in any memory device such as semiconductor, magnetic and optical devices, including a disk, hard drive, CD-ROM, ROM, flash memory, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A tape drive, comprising:
   a head to read or write data to tape that is wound on a take-up reel; and
   a height adjustment assembly comprising:
      a stationary ramp with a sloped surface that is sloped with respect to a bottom surface of the take-up reel; and
      a motor that moves the take-up reel up and down the ramp to adjusts a height of the take-up reel while the tape is being unwound from the take-up reel.

2. The tape drive of claim 1, wherein the height adjustment assembly includes plural rollers that support the take-up reel and move along the sloped surface to adjust the height of the take-up reel.

3. The tape drive of claim 1 further comprising:
   a guide that guides the tape to the head;
   a sensor that senses misalignment between the guide and the tape wound on the take-up reel.

4. The tape drive of claim 1 further comprising, a sensor that senses when the tape is not centered between two opposing flanges of the take-up reel.

5. A method, comprising:
   sensing misalignment between tape for recording data on a reel and a head that reads or writes data to the tape; and
   adjusting a height of the reel by moving the reel along a stationary sloped surface, that is sloped with respect to a bottom surface of the reel, to compensate for the misalignment while the tape is being unwound from the reel.

6. The method of claim 5, wherein the height of the reel is dynamically adjusted in real-time to compensate for the misalignment.

7. The method of claim 5 further comprising, sensing when the tape is misaligned between two flanges of the reel.

8. The method of claim 5 further comprising, reducing disturbances to an edge of the tape from flanges on a guide by adjusting the height of the reel.

9. A tape drive system, comprising:
   a computer;
   a tape cartridge including tape that records data; and
   a tape drive receiving the tape cartridge, being in communication with the computer, and comprising:
      a take-up reel;
      a sensor for sensing misalignment of a tape pack wound on the take-up reel; and
      a height adjustment assembly with a stationary ramp having a sloped surface, that is sloped with respect to a bottom surface of the take-up reel, for changing a height of the take-up reel to compensate for the misalignment while the tape unwinds from the take-up reel.

10. The tape drive system of claim 9, wherein the take-up reel includes two oppositely disposed flanges, and the sensor senses when edges of the tape are not centered between the flanges.

11. The tape drive system of claim 9, wherein the tape drive includes plural ramps and rollers for changing the height of the take-up reel.

12. The tape drive system of claim 9, wherein the tape drive raises or lowers the height of the take-up reel with respect to a body of the tape drive to align the tape with respect to a head.

13. The tape drive system of claim 9, wherein the sensor continuously senses a position of the tape to determine when the tape becomes misaligned with a guide that guides the tape to a head.

* * * * *